Sept. 7, 1954  F. G. GAY, JR., ET AL  2,688,395
SPECTACLE CASE
Filed Oct. 11, 1952

INVENTOR.
FRED G. GAY JR.
BY RAYMOND F.E. STEGEMAN
ATTORNEY.

Patented Sept. 7, 1954

2,688,395

UNITED STATES PATENT OFFICE 2,688,395

SPECTACLE CASE

Fred G. Gay, Jr., Rochester, and Raymond F. E. Stegeman, Greece, N. Y., assignors to Bausch & Lomb Optical Company, Rochester, N. Y., a corporation of New York Application October 11, 1952, Serial No. 314,275

4 Claims. (Cl. 206—5)

This invention relates to spectacle cases and more particularly it has reference to a combined bridge block and spacer member for use in spectacle cases.

Heretofore, bridge blocks were generally made of wood or fairly complex metal parts. In the case of wooden blocks, a considerable amount of time and money was wasted by the large number of blocks that split, both before and after assembly. In the case of metal blocks, all prior devices have used rather complex devices requiring several steps to bend and shape the metal strip and attach it to the spectacle case.

It is, therefore, an object of this invention to provide a bridge block that is extremely simple to manufacture and use. It is another object of this invention to provide a bridge block that is easily assembled in the spectacle case. A further object of this invention is to provide a bridge block that will rigidly hold its position while supporting the sides of the spectacle case in spaced relation.

These and other objects and advantages will be found in the novel details of construction and combination of parts as described in the following specification and shown in the accompanying drawing in which.

Figure 1:
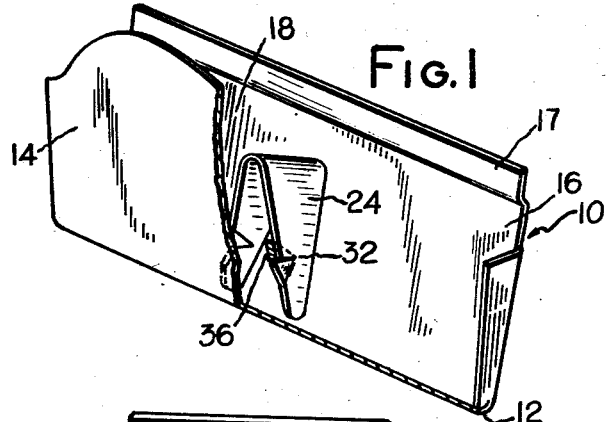
Fig. 1 is a perspective view of a frame for a spectacle case, part of the frame being broken away to show the bridge block and spacer of the present invention.
Figure 2:
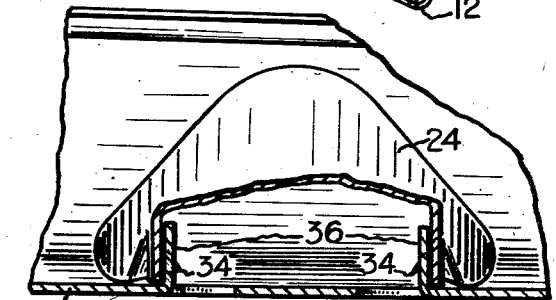
Fig. 2 is a top view of the bridge block and spacer in position with some parts shown broken away and in section.
Figure 3:
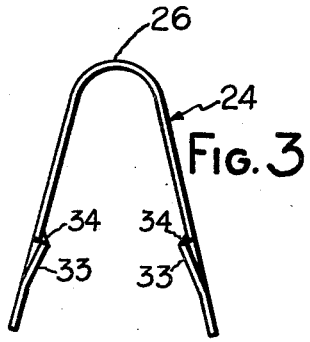
Fig. 3 is an end view of the bridge block and spacer of the present invention.
Figure 4:
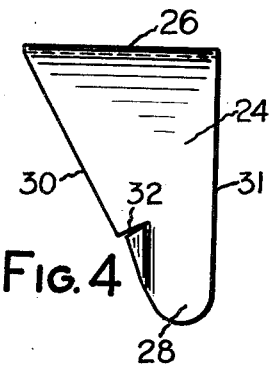
Fig. 4 is a side view of Fig. 3.

Referring to the drawings, the frame 10 is formed of a sheet of resilient material, such as metal or the like, that is shaped or bent upon itself as at 12 to form a V-shaped frame having front and rear walls. The front wall 14 and rear wall 16 form an open pocket 18 therebetween and have an offset portion 17 to which a cover or closure 20 may be attached. The walls 14 and 16 are biased or flexed toward each other, so that a block or other spacing element is inserted between them to hold them apart sufficiently to receive a pair of spectacles therein. The block is centered in the spectacle case so that a pair of spectacles having its nosepiece resting on the block will be centered in the case and will be supported against excessive movement within the case. The block and the walls of the case act together to resist crushing of the contents of the case.

The bridge block or spacer 24 is preferably made of an elongated strip of sheet material, such as sheet steel, tapering in width from the center toward the outer ends. The strip is shaped or bent upon itself at the center 26 to form two downwardly tapered sides or a V-shaped member, each side of said member in cross-section, each side of said member varying in width from a relatively wide sector at the bend to a narrow end sector 28. A front edge 30 of each side of said member has a short slit 32 formed therein. The slits may be in rear edge 31 without departing from the spirit of the invention. The side of slit 32 nearest the outer end of each side is disposed or struck slightly inwardly to form the inclined portions 33 terminating in ledges 34. It is to be understood that the portions 33 could be struck outwardly. Projecting inwardly from one wall of the frame is a pair of lugs 36 adapted to engage with the ledges 34.

Figure 5:
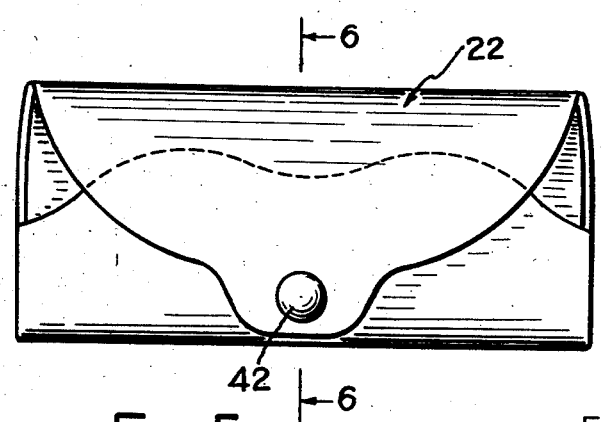
Fig. 5 is a front view of a spectacle case embracing the present invention.
Figure 6:
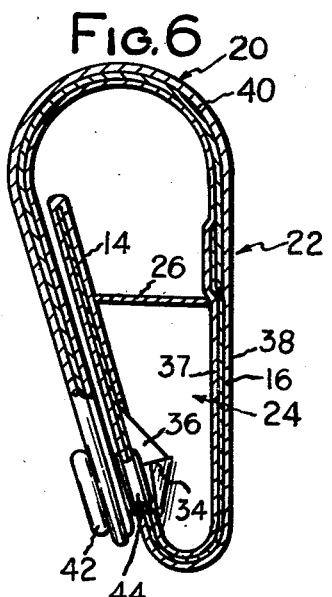
Fig. 6 is a sectional view taken on the line 6—6 of Fig. 5.

The frame 10 is used in several ways in spectacle cases, a preferred form being shown at 22 in Figs. 5 and 6. The frame 10 is laminated or sandwiched between an inner felt material 37 and an outer leatherette or plastic material 38. The two materials extend beyond the offset portion 17 to form the cover 20. A core or stiffening material 40 is attached in offset portion 17 and extends throughout the cover to strengthen the cover. A clasp or other fastening means 42 is attached to the outer end of the closure to engage with button 44 for holding the cover closed over the open end of the case.

In assembling a spectacle case, a bridge block 24 is forced between the inwardly biased walls 14 and 16 with the two ends 28 of the block on the outside of lugs 36. The lugs 36 ride up the inclined portions 33 until they snap over the ledges 34. The combined action of the ledges and the resilience of the parts hold the bridge block securely in place.

While the preferred form of the invention has been herein shown and described, it is to be understood that various changes may be made in the details of construction and in the combination and arrangement of the several parts within the scope of the claims, without departing from the spirit of this invention.

What is claimed as new is:

1. In a spectacle case having a sheet of resilient material bent upon itself to form a frame having front and rear walls, the combination of a bridge block positioned between the walls and comprising a strip of resilient sheet material bent at its middle to form two sides spaced apart at one end, a raised portion struck inwardly along one edge of each side of the bridge block, and a pair of lugs projecting inwardly from one wall of the case, said raised portions being respectively in engagement with the under sides of the lugs and being held in such engagement by the resilience of the sides.

2. A spectacle case comprising a sheet of resilient material bent upon itself to form a frame having front and rear walls biased towards each other, a closure flap hinged to one of said walls for closing the open top of the case, a bridge block fastened within the case for supporting a pair of spectacles and for holding the resilient walls spaced apart, said bridge block comprising an elongated strip of resilient material bent upon itself to form two sides, a pair of raised ledges on the sides of the block, and a pair of spaced lugs projecting inwardly from one of the frame walls respectively adjacent to the ledges, the lugs being spaced apart a distance which is greater than the normal distance between the ledges, said ledges being in engagement, respectively, with the under sides of the lugs whereby the resilience of the block holds the ledges engaged with the lugs.

3. A spectacle case comprising a sheet of resilient material bent upon itself to form a V-shaped frame having front and rear walls, a closure flap hinged to one wall for closing the top of the case, a bridge block comprising a strip of resilient material bent upon itself to form two diverging sides each varying in width from a relatively wide sector at the bend to a relatively narrow end sector for fitting between the front and rear walls of the frame to hold the walls spaced apart, means for holding said block between said walls comprising a raised portion struck inwardly along one edge of each side of the bridge block, and a pair of lugs projecting inwardly from one wall of the frame spaced apart a distance slightly larger than the normal distance between the raised portions in the sides of the block whereby the diverging sides may be forced down over the lugs so that the raised portions will be forced over the lugs and be held in engagement therewith by the resilience of the block and the resilience of the frame.

4. A spectacle case comprising a sheet of resilient material bent upon itself to form a V-shaped frame having front and rear walls biased towards each other, a closure flap hinged to one of said walls for closing the top of the case, a bridge block comprising a strip of resilient material bent upon itself to form two diverging sides, each side of the block tapering in width from a wide sector at the bend to a narrow outer end sector to permit the block to fit between the front and rear walls of the frame, a part of one edge of each side of the block being slanted and bent inwardly from the plane of said side to form a gradually inclined portion and a ledge, said ledge facing the bend in the block, and a pair of lugs projecting inwardly from one wall of the case and spaced apart a distance slightly larger than the normal distance between the ledges in the sides of the block so that as the bridge block is forced into position between the walls of the frame the lugs ride up the inclined portions and snap into secured position with the ledges on the block engaging under the lugs on the frame whereby the resilience of the block holds the block engaged on the lugs and the resilience of the frame holds the block between the walls of the frame.

References Cited in the file of this patent

UNITED STATES PATENTS

| Number | Name | Date |
|---|---|---|
| 809,194 | Linnig | Jan. 2, 1906 |
| 1,891,233 | Lachter | Dec. 20, 1932 |
| 2,540,542 | Nathan | Feb. 6, 1951 |
| 2,546,755 | Jones | Mar. 27, 1951 |

FOREIGN PATENTS

| Number | Country | Date |
|---|---|---|
| 517,257 | Great Britain | Jan. 24, 1940 |